United States Patent [19]
Schlotterbeck et al.

[11] 3,869,938
[45] Mar. 11, 1975

[54] CAM SHAFT FOR RECIPROCABLE PISTON INTERNAL COMBUSTION ENGINES

[75] Inventors: Heinz Schlotterbeck; Walter Staake, both of Cologne, Germany

[73] Assignee: Klockner-Humboldt-Deutz Aktiengesellschaft, Cologne-Deutz, Germany

[22] Filed: June 27, 1973

[21] Appl. No.: 373,981

[30] Foreign Application Priority Data
July 1, 1973   Germany............................ 2232438

[52] U.S. Cl.................................... 74/567, 72/56
[51] Int. Cl.............................................. F16h 53/00
[58] Field of Search.......................... 74/567, 568 R

[56] References Cited
UNITED STATES PATENTS
2,202,330   5/1940   Brock et al. .......................... 74/567
2,892,254   6/1959   Garvin ............................. 74/567 X FOREIGN PATENTS OR APPLICATIONS
817,382   9/1937   France................................ 74/567

*Primary Examiner*—Samuel Scott
*Assistant Examiner*—F. D. Shoemaker
*Attorney, Agent, or Firm*—Walter Becker

[57] ABSTRACT

A cam shaft which is formed by radially expanding portions of a cylindrical steel pipe and reinforced by a further pipe coaxial with the steel pipe and supportingly engaging unexpanded portions of the steel pipe on the inside thereof.

8 Claims, 6 Drawing Figures

CAM SHAFT FOR RECIPROCABLE PISTON INTERNAL COMBUSTION ENGINES

The present invention relates to a cam shaft, especially for reciprocable piston internal combustion engines, which is made of a steel pipe and in a forging die has within the region of the cams been widened and between the cams has a circular shape.

When the cam shaft is intended for a reciprocable piston internal combustion engine, highly different forces act upon the hollow structure of the cams. More specifically, shock forces, acceleration forces, spring forces and gas forces act upon the cams. In addition thereto, the cams are subjected to high specific surface pressures. The cam shaft is bent in its entirety and is subjected to running ahead and dragging torques. The bending stresses and the torsion stresses occur rather non-uniformly inasmuch as the forces as well as the effective lever arm on the cams change.

When widening a pipe to form a cam shaft, it has to be borne in mind that the strength of the wall portions within the region of the elevations of the cams should not be weakened by local stretching of the material. In view of this fact, the question arises whether it is expedient to meet the high stresses of the cam shaft merely by sufficiently dimensioning the cam elevations with regard to their wall thickness.

It is an object of the present invention to provide an improved tubular cam shaft and method of making the same in such a way that the shaft areas will have a substantially uniform wall thickness.

It is another object of this invention to provide a tubular cam shaft in which the shaft is reinforced as to its rigidity.

These and other objects and advantages of the invention will appear more clearly from the following specification in connection with the accompanying drawings, in which.

Figure 3:
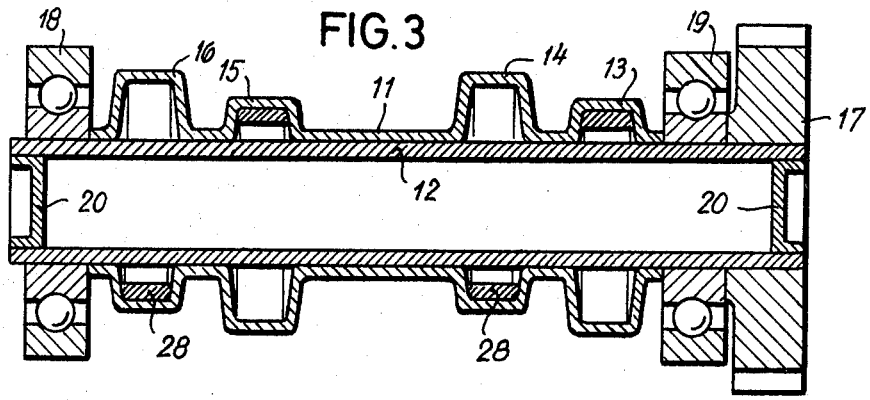
Figure 4:
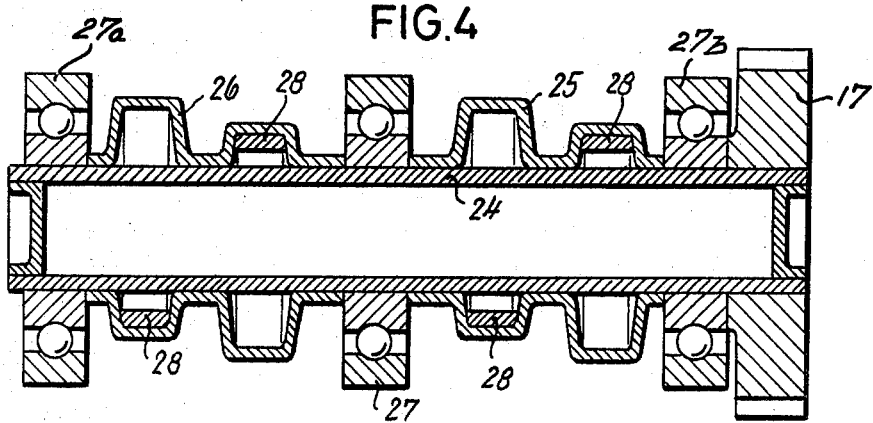
Figure 5:
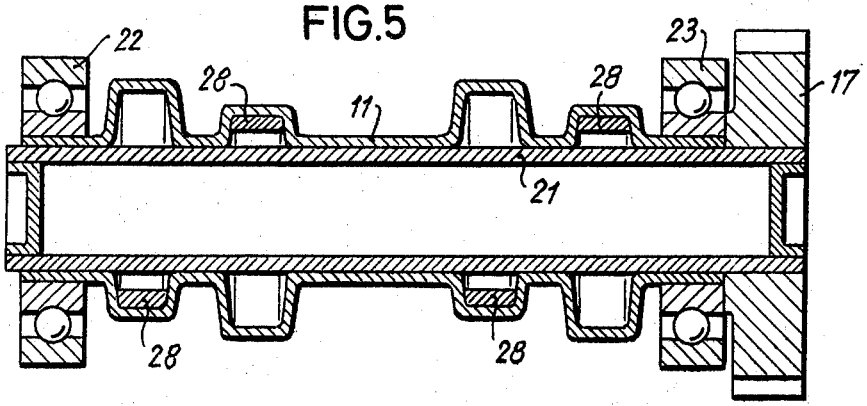

FIGS. 3-5 respectively illustrate in an axial section finished cam shafts with their bearings and their drive wheel.

Figure 6:
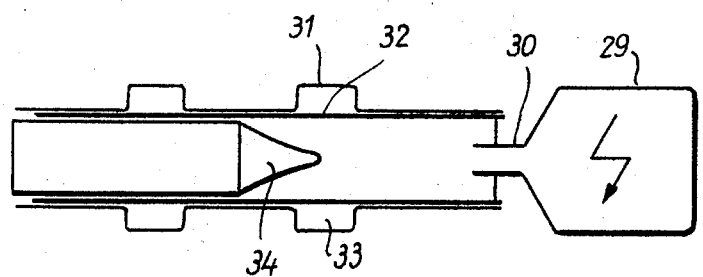

FIG. 6 illustrates by way of a diagrammatic section the deformation of a steel pipe by means of an electrohydraulic shaping operation.

According to the present invention it is suggested that the cam pipe is within the region of the cams widened by means of a high speed pressure method, and that the interior of the cam pipe comprises a cylindrical pipe of circular cross section which with its outer surface closely engages the cylindrical inner surface of the cam pipe in a play-free manner, preferably with close fit.

The application of the high speed pressure method has the advantage that the finished hollow cam pipe has throughout its entire length substantially the same wall thickness. This advantageous property of the cam pipe is obtainable by the fact that the deforming forces of the high speed pressure method which are necessary for widening the pipe may be made effective only within the region of the cam recesses of the forging die onto the pipe section of the cylindrical pipe to be deformed so that as a result thereof the material of the pipe adjacent the cams can also flow into the cam recesses of the forging die.

The invention makes it possible, when selecting the pipe to be widened to a cam shaft, to take into consideration the supporting effect of the inner pipe with regard to the stresses to which the cam shaft is subjected during its operation. The cylindrical pipe which with tight fit engages the cylindrical inner surface of the cam shaft has the advantageous effect that the pipe supports from the inside in particular the side walls of the cams. In view of the tight fit between the cam pipe and the inner pipe, a friction of rest occurs between the contact surfaces of the two pipes which friction prevents the circular parts of the cam pipe which are located between the individual cams from being displaced in the longitudinal direction of the cam shaft. In this way it will be assured that the side walls of the cams cannot escape toward the sides. Summarizing the situation, it will be appreciated that the hollow structure of the cam elevation is by the inner pipe of the cam shaft influenced in such a favorable manner that for purposes of producing the cam pipe proper, relatively thin pipes may be employed. Thin pipes easier follow the inner shape of the forging die and, as tests have proved, are particularly suited for deformation by a high speed pressure method.

Within the framework of the invention various possibilities of design are available for the cam pipe proper as well as for the inner pipe.

A preferred embodiment of a cam shaft according to the invention is characterized primarily in that the inner pipe and the cam pipe, each one considered by itself, are formed of one piece over the entire length of the cam shaft. However, this is by no means a necessity. The cam shaft may also be so designed that a single piece in the pipe extends over the entire length of the cam shaft, whereas the cam pipe is subdivided into a plurality of sections which may be spaced from each other. According to a further development of the invention it is advantageous to connect the cam pipe or the cam pipe sections to the inner pipe by connecting means, for instance, by spot welding.

As to the drive for the cam shaft, it is provided according to the invention that the inner pipe on one side of the cam shaft has an extension upon which the driving wheel of the cam shaft is mounted. For purposes of protecting the interior of the cam shaft, it is suggested according to the invention, to close the inner pipe at both ends thereof. If the cam shaft is a high speed cam shaft, it may be expedient to provide an equalization of the mass forces and mass moments for the cam shaft. According to the invention, this is taken care of by inserting balancing weights into the hollow spaces of the cams at that side which faces away from the cam elevation.

Referring now to the drawings in detail, the steel pipe 1 from which the control cam shaft is formed is with slight radial play located in the hollow form or mold 2, 3 which is designed in the form of a forging die. The joint 4 of the hollow mold is over the major portion of its length located on both sides in the axis plane of the later finished cam shaft. As far as the shaping of the finished cam shaft requires, the parting line is offset unilaterally with regard to the axis plane, for instance, at the area 5.

The hollow mold is at four areas 6, 7, 8 and 9 widened for the formation of the cams to actuate the inlet and outlet valves. At both sides of the widened portions 6–9, the hollow mold is cylindrical.

The coil 10 for the impulse discharge is arranged on a shank 10a which comprises the feeding lines for the current, and by means of a non-illustrated slide is displaceable in the direction of the axis of pipe 1 in order to permit a section-wise shaping by shock discharge.

Figure 1:
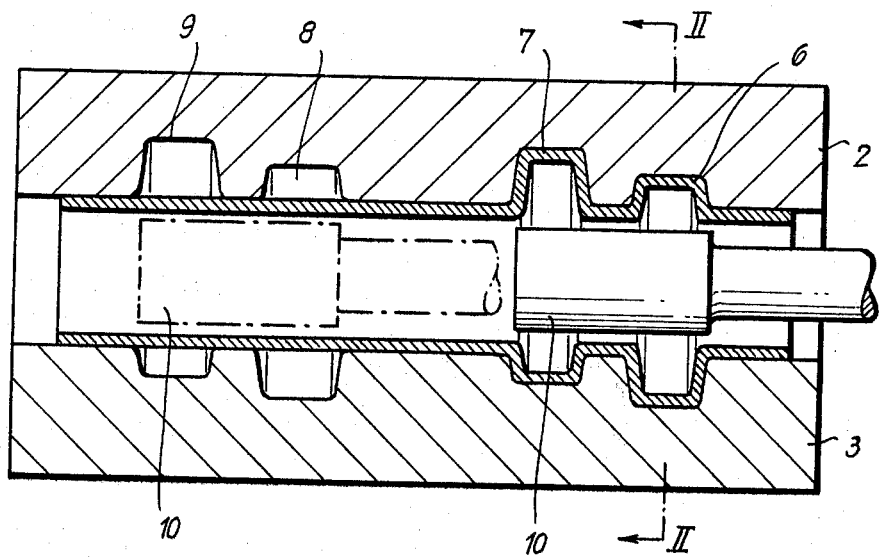
FIG. 1 is an axial section taken along the line I — I of FIG. 2 and illustrates two successive phases of the deformation of a control cam shaft for a two-cylinder diesel engine by means of an electromagnetic shaping operation.

FIG. 1 illustrates in full lines the coil 10 in its first position in which it forms the cams 6 and 7. The position of the coil 10 indicated in dot-dash lines represents the position for forming the cams 8 and 9. Generally, with a control cam, the highest elevation, i. e. the area where the material of pipe 1 must flow strongest into the recess of the forging die, is located opposite a relatively low recess. It is of particular advantage for the manufacture of such cam elevations to employ the electromagnetic molding method which operates with shock discharge because this method, as the only method, has made it possible to employ the coil 10 to be moved in the interior of pipe 1 with a unilaterally reinforced shock effect in the direction toward the highest/cam elevation. To this end, the coil is divided over its entire circumference into segments which are energized to a different degree. If desired, also some segments may be disconnected in a simple manner from the current supply.

FIGS. 3–5 illustrate cam shafts which are made of steel pipes in conformity with the present invention and which in their interior have a cylindrical steel pipe that has its outer surface in engagement with the cylindrical inner surface of the cam shaft in a play-free manner, preferably with tight fit. The steel pipe, so to speak, forms the backbone of the cam shaft in which it absorbs to a major extent the bending and torsion stresses. In addition thereto, the inner steel pipe has the advantageous effect that it supports the hollow portions of the cam, in particular the side walls thereof.

FIG. 3 shows a cam shaft 11 with inner pipe 12 which is made in conformity with the present invention. The cams are designated with the reference numerals 13, 14, 15 and 16. The inner pipe 12 extends as a single piece beyond the two ends of the cam pipe 11. The projecting ends of the inner pipe 12 serve for journalling the cam shaft and also for receiving the driving gear 12. The cam shaft is journalled by antifriction bearings 18 and 19. The ends of the inner pipe are closed by closure means or stoppers.

Figure 2:
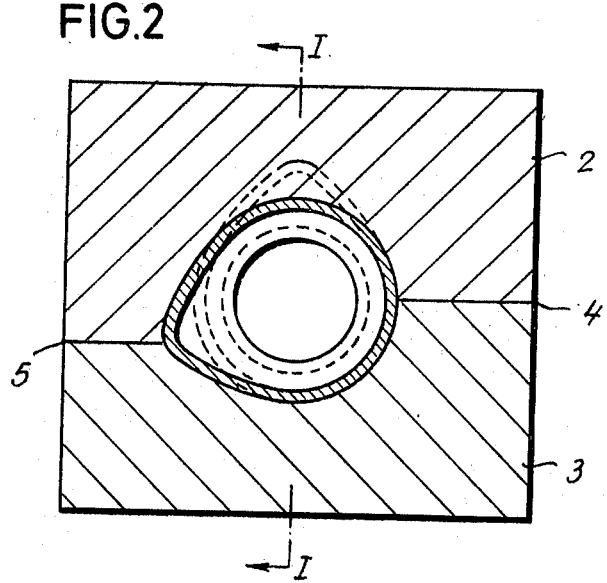
FIG. 2 is a cross section taken along the line II — II of FIG. 1.

The embodiment according to FIG. 4 is characterized primarily in that the inner pipe 24 extends over and beyond the entire length of the cam shaft, whereas the cam pipe is divided into a plurality of sections, in the illustrated embodiment into two sections 25 and 26, which are spaced from each other. This has the advantage that, as will be evident from FIG. 2, a special or additional bearing can be arranged between the individual cam groups which additional bearing in this instance is formed by the antifriction bearing 27. The antifriction bearings 27a and 27b are mounted directly on the inner pipe 24. Within the framework of the present invention it is also possible to divide the cam pipe into a plurality of sections when the cam shaft is to be journalled at its ends only. This might offer advantageous possibilities with regard to the manufacturing process. Generally, it is expedient to connect the cam pipe or cam pipe sections, in addition to their tight fit, to the inner pipe by mechanical means, for instance, by spot welding or by clamping pins.

The embodiment of FIG. 5 differs from that of FIG. 3 primarily in that the inner pipe 21 is, substantially at that side on which the driving gear 17 is located, extended beyond the cam pipe 11, and the antifriction bearing 22 and 23 are correspondingly mounted directly on the cam pipe 11.

With the cam shafts illustrated in FIGS. 3–5, balancing weights 28 are arranged in the cams, and more specifically on that side thereof which faces away from the cam elevation.

The pipe for producing the cam shaft must be selected so large that it will be able to receive the coils 10 in its interior. In this connection it will be obvious that in view of this requirement the finished cam shaft will have a larger diameter than a cam shaft which is made from a solid piece. The inner pipe according to the invention will in this connection also have the great advantage that it can be used for journalling the cam shaft. Inasmuch as the bearings have a greater radial extension than the greatest elevation of the cams, it is also possible in this connection to provide a cam shaft which can be built into the machine as a slide-in cam shaft. In this way divided bearing areas for the cam shaft in the machine housing will be avoided.

The cam shaft illustrated in FIGS. 3–5 may also be made by means of an electrohydraulic shaping method. With this method, the shaping of the steel pipe is effected by pressure shocks in water which water is provided in the interior of the cam pipe. The pressure shocks are created by igniting a beryllium-copper electrode in an explosion chamber 29. When releasing the energy, a portion of the water is heated up and evaporates which fact, in view of the high speed expansion, produces pressure waves. These pressure waves are through a connecting member 30 conveyed into the pipe 32 which is chucked in a forging die 41 while previously a slight vacuum was produced in the hollow chambers 33 of the forging die. In order to obtain an aimed deformation within the region of the cams, a reflector 34 is employed. The cross section of the explosion chamber and the connecting area, the diameter of the pipe, the reflector shape and the pressure wave energy are so tuned to each other that within the region of the cam to be formed strong radial forces occur while in view of the pressure distribution it will be assured that material can flow from the free end of the pipe to be formed to the deforming area. The deformation of the cam pipe is effected in a plurality of stages.

It is, of course, to be understood that the present invention is, by no means, limited to the specific showing in the drawings but also comprises any modifications within the scope of the appended claims.

What is claimed is:

1. A cam shaft, especially for internal combustion engines comprising:

a cylindrical steel pipe having axial regions thereof expanded radially to form eccentric cam portions, and a cylindrical reinforcing element coaxially disposed inside said steel pipe and having the radially outer surface thereof in supporting engagement with the cylindrical inner surface of said steel pipe on opposite axial sides of the respective said eccentric cam portions, and counterbalancing weights disposed inside said cam portions in those regions thereof disposed nearest the axis of said cam shaft.

2. A cam shaft according to claim 1 in which said reinforcing element is in the form of a single piece of further pipe that extends the entire length of said cam shaft, said steel pipe also being in the form of a single piece of pipe.

3. A cam shaft according to claim 1 in which said reinforcing element is in the form of a further pipe extending the entire length of said cam shaft, said cam shaft being formed from individual axial sections of steel pipe and distributed in coaxial relation in the axial direction of said further pipe.

4. A cam shaft according to claim 1 in which the steel pipe from which said cam shaft is formed is fixedly connected to said reinforcing element as by welding.

5. A cam shaft according to claim 1 in which said reinforcing element protrudes from at least one end of said steel pipe and is adapted for having a member for driving the cam shaft mounted thereon.

6. A cam shaft according to claim 1 in which said reinforcing element is in the form of a further pipe, and means closing the opposite ends of said further pipe.

7. A cam shaft according to claim 1 in which said reinforcing element protrudes from both ends of said steel pipe and is adapted to engage support bearing for the cam shaft.

8. A cam shaft according to claim 1 in which the opposite ends of said steel pipe are adapted to engage support bearings for said cam shaft.

* * * * *